(12) United States Patent
Vanderbeek

(10) Patent No.: US 9,180,535 B2
(45) Date of Patent: Nov. 10, 2015

(54) MULTI TOOL SAW

(75) Inventor: Karl Vanderbeek, West Hartford, CT (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 466 days.

(21) Appl. No.: 13/450,201

(22) Filed: Apr. 18, 2012

(65) Prior Publication Data

US 2013/0276241 A1    Oct. 24, 2013

(51) Int. Cl.
| | | |
|---|---|---|
| *B25F 1/00* | (2006.01) | |
| *B23D 51/03* | (2006.01) | |
| *B23D 49/10* | (2006.01) | |
| *B25F 1/04* | (2006.01) | |
| *B23D 49/12* | (2006.01) | |
| *B23D 51/12* | (2006.01) | |
| *B23D 51/14* | (2006.01) | |

(52) U.S. Cl.
CPC ............... *B23D 51/03* (2013.01); *B23D 49/10* (2013.01); *B25F 1/04* (2013.01); *B23D 49/12* (2013.01); *B23D 51/125* (2013.01); *B23D 51/14* (2013.01)

(58) Field of Classification Search
CPC .......... B25F 1/04; B23D 49/10; B23D 49/12; B23D 51/01; B23D 51/03
USPC .............................................................. 7/149
See application file for complete search history.

(56) References Cited

U.S. PATENT DOCUMENTS

| | | | |
|---|---|---|---|
| 925,112 A | | 6/1909 | Leland |
| 983,796 A | * | 2/1911 | Allen ................................. 7/142 |
| 1,558,036 A | * | 10/1925 | Moffitt ............................... 7/142 |
| 2,204,390 A | | 6/1940 | Albright |
| 2,642,906 A | | 6/1953 | Henderson |
| 2,658,541 A | | 11/1953 | Heuneman |
| 3,038,177 A | * | 6/1962 | Machtle ............................ 7/144 |

(Continued)

FOREIGN PATENT DOCUMENTS

| | | |
|---|---|---|
| CN | 1994645 | 7/2007 |
| CN | 1994645 A * | 7/2007 |

(Continued)

OTHER PUBLICATIONS

Extended Search Report, including the Search Opinion, as issued for European Patent Application No. 13164173.0, dated Sep. 2, 2013.

(Continued)

*Primary Examiner* — Bryan R Muller
(74) *Attorney, Agent, or Firm* — Pillsbury Winthrop Shaw Pittman LLP

(57) ABSTRACT

A multi-tool saw assembly includes a saw assembly and a utility tool. The saw assembly includes a frame having a first end and a second end. The saw assembly also includes a first handle fixed relative to the frame. The saw assembly further includes a saw blade, selectively coupled to the frame and extending between the first end and the second end. The saw blade includes a first connection portion connected to the first end and a second connection portion connected to the second end. The utility tool includes a second handle and a work portion. The second handle forms a portion of the frame and/or the first handle. The utility tool is separable from the saw assembly. The saw blade remains connected to the first end and the second end, and the first handle remains connected to the frame, when the utility tool is separated from the saw assembly.

19 Claims, 5 Drawing Sheets

(56) References Cited

U.S. PATENT DOCUMENTS

| | | | |
|---|---|---|---|
| 3,245,445 A | 4/1966 | Herman et al. | |
| 5,074,002 A * | 12/1991 | Huang | 7/149 |
| 5,271,158 A | 12/1993 | Chen | |
| 5,377,416 A | 1/1995 | Petraccoro | |
| 5,722,173 A | 3/1998 | Huang | |
| 6,578,268 B2 | 6/2003 | Hawketts | |
| D486,373 S | 2/2004 | Jimenez | |
| 6,742,268 B2 | 6/2004 | Chen | |
| 6,820,340 B1 | 11/2004 | Martin et al. | |
| 6,820,341 B2 | 11/2004 | Snider | |
| 6,925,720 B2 | 8/2005 | Ranieri | |
| 7,174,644 B2 * | 2/2007 | Critelli et al. | 30/512 |
| D563,189 S | 3/2008 | Gringer | |
| 7,617,608 B2 | 11/2009 | Zakarian | |
| 8,776,385 B2 * | 7/2014 | Huang | 30/512 |
| 2012/0011732 A1 * | 1/2012 | Ranieri et al. | 30/506 |

FOREIGN PATENT DOCUMENTS

| | | |
|---|---|---|
| CN | 101712147 A | 5/2010 |
| DE | 608876 | 2/1935 |
| DE | 1800199 | 11/1959 |
| DE | 9107296.4 | 8/1991 |
| DE | 19507300 | 11/1995 |
| DE | 29622309 | 2/1997 |
| DE | 20205031 | 8/2002 |
| DE | 20217051 | 1/2003 |
| DE | 202005011656 | 12/2005 |
| DE | 20 2011 052279 U1 | 3/2012 |
| DE | 202011052279 U1 * | 5/2012 |
| EP | 0751846 B | 1/1997 |
| EP | 1595631 B | 11/2005 |
| GB | 854817 | 11/1960 |
| GB | 1027590 | 4/1966 |
| GB | 2291621 | 1/1996 |
| GB | 2444616 | 6/2008 |

OTHER PUBLICATIONS

Nicholson 4-In-1 Pro Series Hacksaw Frame. [online] Cooper Hand Tools, Catalog 80975 Product Details, 2005 [retrieved on Sep. 20, 2011]. Retrieved from the Internet <URL: http://www.cooperhandtools.com/brands/CF_Files/model_detail.cfm?upc=037103809759>.

Extended European Search Report issued in European Patent Application No. EP 14180424.5 dated Oct. 7, 2014.

* cited by examiner

MULTI TOOL SAW

FIELD OF THE INVENTION

The present invention relates generally to hand tools, and more particularly to sawing tools.

BACKGROUND OF THE INVENTION

Hacksaws are saws having a frame that holds a blade in tension. Hacksaw frames typically have an arched configuration, with the blade coupled to both ends of the arched configuration. A handle is generally mounted to, or formed with, the arched configuration of the frame, and usually includes a pistol grip configuration. Some hacksaws are configured to support a variety of different uses, or be placed in a variety of different configurations. For example, U.S. Patent Application Publication No. 2012/0011732, incorporated herein in its entirety by reference, discloses embodiments of such hacksaws. Among other things, the present application relates to an improved hacksaw design configured to support a variety of different uses.

SUMMARY OF THE INVENTION

According to one aspect of this disclosure, a multi-tool saw assembly includes a saw assembly and a utility tool. The saw assembly includes a frame having a first end and a second end. The saw assembly also includes a first handle fixed relative to the frame. The saw assembly further includes a saw blade, selectively coupled to the frame and extending between the first end and the second end. The saw blade includes a first connection portion connected to the first end and a second connection portion connected to the second end. The utility tool includes a second handle and a work portion. The second handle forms a portion of the frame and/or the first handle. The utility tool is separable from the saw assembly. The saw blade remains connected to the first end and the second end, and the first handle remains connected to the frame, when the utility tool is separated from the saw assembly.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of the tool in accordance with one embodiment are shown in the drawings, in which like reference numerals designate like elements. The drawings form part of this original disclosure in which.

DETAILED DESCRIPTION OF THE ILLUSTRATED EMBODIMENT(S)

Figure 1:
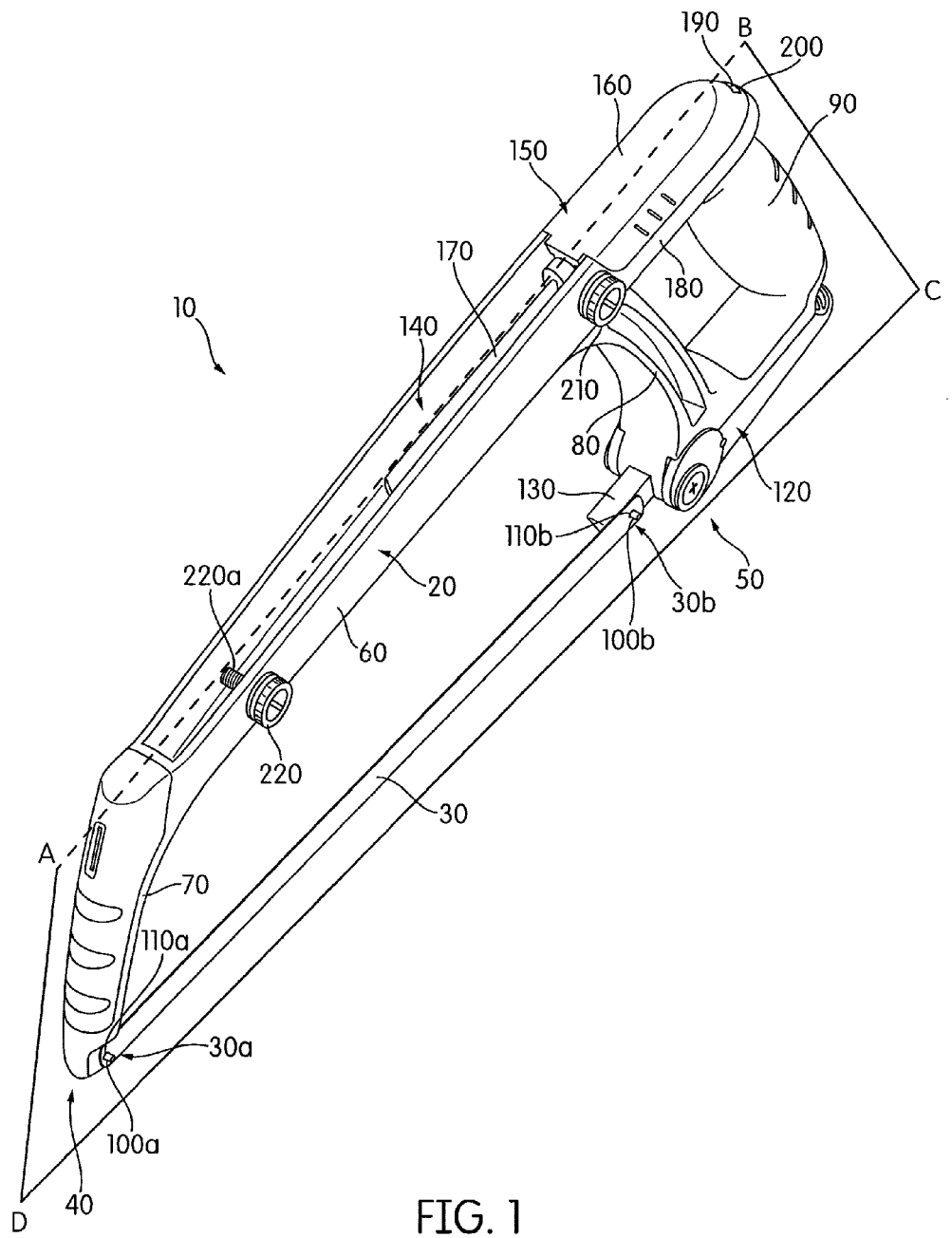
FIG. 1 is a perspective view of an embodiment of a hacksaw of the present disclosure.

FIG. 1 illustrates a hacksaw assembly 10 configured for a variety of different operable configurations. As shown, the hacksaw assembly 10 includes a frame 20 configured to support a hacksaw blade 30. In particular, the frame 20 includes a first end 40 and a second end 50, configured to support the blade 30 therebetween. The frame 20 is generally oriented along a vertical plane ABCD, and as such, may be configured to support the hacksaw blade 30 generally parallel to and/or in the vertical plane ABCD. It may be appreciated that in operation of the hacksaw assembly 10, where the hacksaw blade 30 is supported generally parallel to and/or in the vertical plane ABCD, the blade 30 may be considered to be in a 90 degree blade orientation relative to a cutting surface. As described in greater detail below, in some embodiments, the hacksaw blade 30 may alternatively be supported along the vertical plane ABCD, however at a 45 degree blade orientation relative to the cutting surface, to facilitate angled cutting therein. In an embodiment, a direction of operation for the hacksaw 10 may comprise moving the hacksaw blade 30 generally along the plane ABCD, towards and away from the user of the hacksaw 10.

As shown, the frame 20 of the hacksaw assembly 10 generally comprises an arched configuration, with an upper portion 60 spaced from the hacksaw blade 30. A forward portion 70 is configured to extend between the upper portion 60 and a forward connecting end 30a of the hacksaw blade 30. Additionally, a rearward portion 80 is configured to extend between the upper portion 60 and a rearward connecting end 30b of the hacksaw blade 30. While, in the illustrated embodiment, the upper portion 60, the forward portion 70, and the rearward portion 80 are generally formed together, and are curved into one another to define the arched configuration, in other embodiments, the upper portion 60, the forward portion 70, and the rearward portion 80 may be separately assembled together, and/or may be joined by angled intersections.

Further shown in FIG. 1 is that a hacksaw handle 90 may extend from the frame 20. In the illustrated embodiment, the hacksaw handle 90 is positioned adjacent to the second end 50. As shown, in some embodiments the hacksaw handle 90 may be oriented at an angle relative to the orientation of the hacksaw blade 30, and may utilize the rearward portion 80 of the frame 20 as a finger guard. In some embodiments, the hacksaw handle 30 may comprise a configuration similar to a pistol grip, where an index finger of a hand engaging the hacksaw handle 30 may be extended generally in the direction of movement for the hacksaw blade 30. It may be appreciated that in some embodiments the hacksaw handle 90 may be integrally formed with the frame 20, while in other embodiments may be mounted thereto. In some embodiments, such as where the frame 20 is formed of a solid or otherwise rigid metal, the hacksaw handle 90 may include a softer grip material, which may increase user comfort when operating the hacksaw assembly 10.

As indicated above, the hacksaw blade 30 is coupled to the frame 20. In the illustrated embodiment, the forward connecting end 30a is fixedly mounted to the forward portion 70 of the frame 20. In particular, a forward mounting pin 100a (seen in greater detail in FIG. 2) is configured to extend from the forward portion 70, and be received in a forward blade aperture 110a located at the forward connecting end 30a of the hacksaw blade 30. At the rearward connecting end 30b of the hacksaw blade 30, a rearward blade aperture 110b is configured to receive a rearward mounting pin 100b that is associated with the rearward portion 80 of the frame 20. The rearward mounting pin 100b is shown more clearly in FIG. 4, described in greater detail below. Additionally, the forward blade aperture 110a and the rearward blade aperture 110b of the hacksaw blade 30 are seen more clearly in the exploded view of FIG. 3, described below, which shows the hacksaw blade 30 separated from the frame 20.

In the illustrated embodiment of FIG. 1, the hacksaw blade 30 may be held under tension within the frame 20. Specifically, while the forward mounting pin 100a is fixed relative to the forward portion 70 frame 20, the rearward mounting pin 100b may be movable relative to the frame 20, by being coupled to a blade tensioner arrangement 120 associated therewith. Although described in greater detail below, it may be appreciated that the blade tensioner arrangement 120 may include a movable mounting arm 130, onto which the rearward mounting pin 100b is fixed. By being slidable closer to and further from the forward portion 70 (and in particular, the forward mounting pin 100a), a tension across the hacksaw blade 30 may be applied or relaxed. It may be appreciated that tension applied to the hacksaw blade 30 may prevent removal of the hacksaw blade 30 from the frame 20, while the removal of such tension may allow the hacksaw blade 30 to be removed, by sliding the forward blade aperture 110a along the forward mounting pin 100a, while sliding the rearward blade aperture 110b along the rearward mounting pin 100b.

Further illustrated in FIG. 1 is that the upper portion 60 of the frame 20 may contain therein a receiving space 140. In some embodiments, the receiving space 140 may be configured to receive a spare hacksaw blade 30, as described in greater detail below. As shown in the illustrated embodiment, the blade receiving space 140 may be configured to receive at least a portion of a removable utility tool 150. As shown, the removable utility tool 150 includes a utility handle 160 and an operable portion 170. The removable utility tool 150 may be of any appropriate construction or configuration. Accordingly, the configuration of the operable portion 170 may vary across embodiments. In the illustrated embodiment, the operable portion 170 comprises a file. In other embodiments, the operable portion 170 may comprise a jab saw, a knife, a screwdriver, a bit driver, an awl, or any other appropriate tool.

In some embodiments, the operable portion 170 may be fixed to the utility handle 160. Such connection between the operable portion 170 and the utility handle 160 may be through welding, application of adhesive, integral molding, forming together, fastening with one or more permanent fasteners, or by any other appropriate mechanism. In other embodiments, the operable portion 170 may be separable from the utility handle 160, so as to allow different operable portions 170 to be coupled thereto. For example, one or more releasable fasteners may be associated with either or both of the operable portion 170 and the utility handle 160. As other examples, clips, friction mounts, screws, pins, or other attachment mechanisms may be utilized to releasably couple the operable portion 170 to the utility handle 160. In an embodiment, the utility handle 160 may contain therein a receiving space configured to frictionally engage with the operable portion 170, such that the operable portion 170 partially slides into the utility handle 160, and may be frictionally retained, may be secured by a spring-biased ball bearing, or may be retained by any other engagement.

As shown in the illustrated embodiment, the utility handle 160 may be received on or by a handle connecting portion 180 of the frame 20, which extends from the upper portion 60 and/or the rearward portion 80 towards the hacksaw handle 90. As the utility handle 160 is received on the handle connecting portion 180, the operable portion 170 of the removable utility tool 150 may extend into the receiving space 140. In the illustrated embodiment, the receiving space 140 is open on one side, and has a generally U-shaped configuration. In other embodiments, however, the receiving space 140 may be enclosed, and may form a bore into the frame 20 that may receive the operable portion 170 of the removable utility tool 150.

As described in greater detail below, in an embodiment the removable utility tool 150 may be secured to the frame 20 by any appropriate mechanism. For example, in the illustrated embodiment, an engagement tab 190 is formed on the handle connecting portion 180, and is configured to be received in a slot 200 formed in the utility handle 160 of the removable utility tool 150. It may be appreciated that to receive the engagement tab 190 in the slot 200, the utility handle 160 may generally be slid laterally so as to decouple the engagement tab 190 from the slot 200. In some embodiments, such engagement may be coupled with a frictional engagement between surfaces of the removable utility tool 150 and the frame 20 (including, for example, the handle contacting portion 180). In an embodiment, such as that illustrated, a non-frictional securement may additionally or alternatively be provided to fix the removable utility tool 150 relative to the frame 20. For example, in the illustrated embodiment, a turnscrew 210 may extend through the upper portion 60 into the receiving space 140, and may be configured to engage with the utility tool 150. In some embodiments, a portion of the turnscrew 210 may selectively extend into a receiving aperture or other engagement feature on the utility tool 150, while in other embodiments the turnscrew 210 may frictionally engage the utility tool 150. It may be appreciated that in some embodiments other engagement mechanisms may be utilized in lieu of the illustrated turnscrew 210. For example, pins, tabs, latches, magnets, spring biased engagements, and/or other appropriate mechanisms may be utilized instead to couple the utility tool 150 to the frame 20. As one non-limiting example, it may be appreciated that in an embodiment the In other embodiments, the engagement tab 190 may be configured to be selectively depressed so as to disengage the engagement tab 190 from the slot 200 of the utility tool 150, facilitating the subsequent removal of the utility tool 150 from the frame 20.

FIG. 1 also illustrates an additional turnscrew 220, extending into the receiving space 140. It may be appreciated that in an embodiment, a shaft 220a of the turnscrew 220 may be configured to engage either the forward blade aperture 110a or the rearward blade aperture 110b of the blade 30 (e.g., for storage of the blade 30 in the receiving slot 140), or may engage similar blade apertures or engagement features of a spare blade 30. In an embodiment, a stored blade 30 may extend entirely within the upper portion 60 of the frame 20, along the receiving space 140. In some embodiments, the stored blade 30 may be engaged by both the turnscrew 220 and the turnscrew 210 during storage of the stored blade 30 (e.g., where the turn screw 220 and the turnscrew 210 are spaced the same distance as between the forward blade aperture 110a or the rearward blade aperture 110b, when the stored blade 30 is not under tension).

Figure 2:
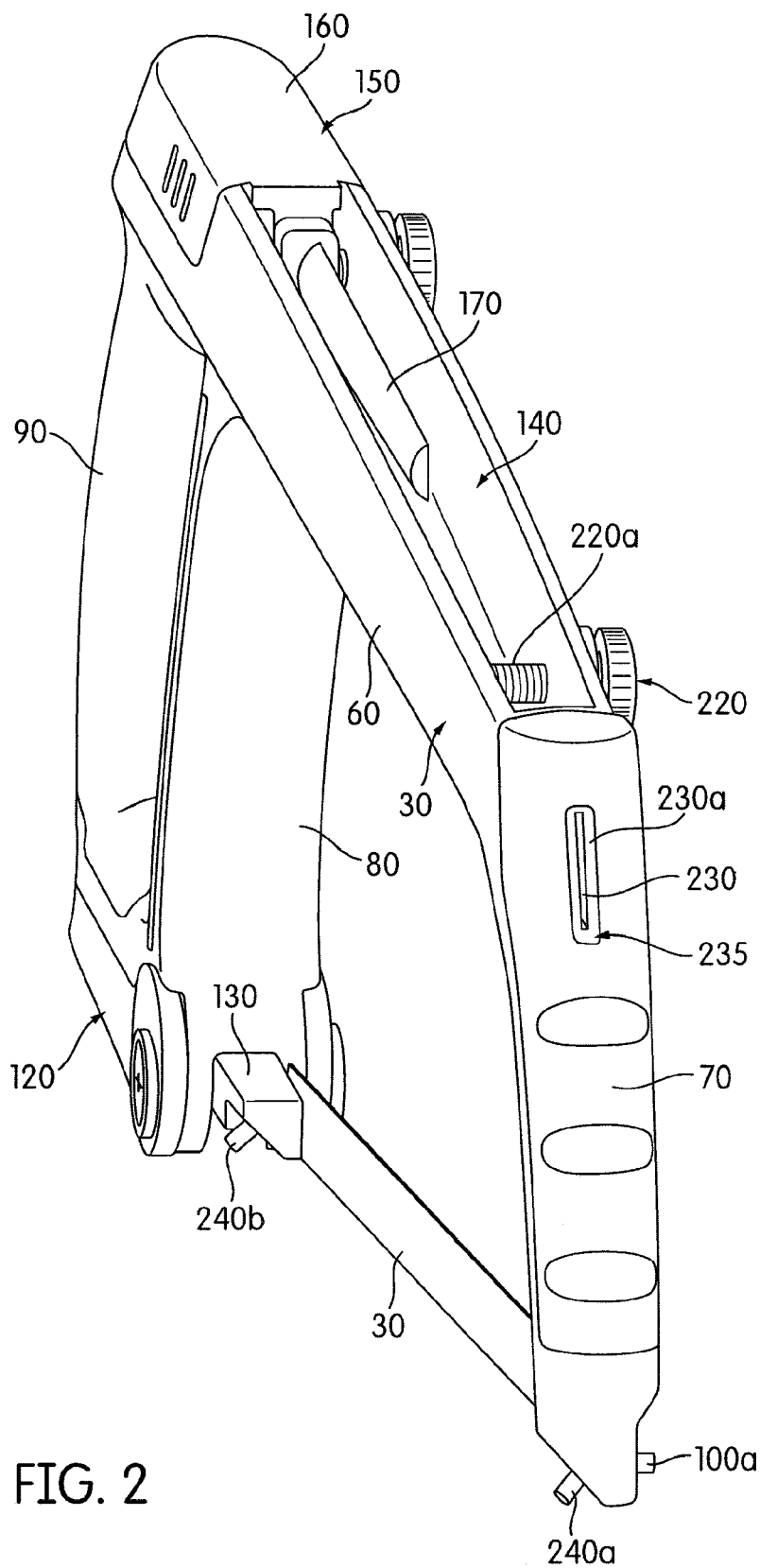
FIG. 2 illustrates another perspective view of the hacksaw of FIG. 1.

As shown in FIG. 2, in some embodiments the turnscrew 220 may be configured to support a blade, such as the blade 30, extending through the forward portion 70 of the frame 20. For example, in the illustrated embodiment, an aperture 230 extends from a front surface of the forward portion 70 into the receiving space 140. In some embodiments, the aperture 230 is formed in an aperture defining body 230a, described in greater detail below, which may be received in an opening 235 formed in the forward portion 70. In an embodiment, the aperture defining body 230a may abut a flanged region of the opening 235. In other embodiments, the aperture defining body 230a may by positioned flush with the opening 235.

It may be appreciated that in some embodiments, the blade 30 may be coupled to the frame 20 such that the forward blade aperture 110a or the rearward blade aperture 110b is coupled to the turnscrew 220, while an intermediate portion of the blade 30 extends through the aperture 230, and the other of the forward blade aperture 110a and the rearward blade aperture 110b extends forward of the forward portion 70. In such a configuration, a user of the hacksaw assembly 10 may utilize the blade 30 as a protruding blade, or otherwise may control motion of the blade 30 through engagement of the handle 90 of the hacksaw assembly 10, without the blade 30 being surrounded on both sides by the frame 20. Such a protruding configuration may allow the blade 30 to cut into regions that are generally harder to reach, or have smaller surrounding clearance than would be allowed by the blade 30 being substantially surrounded by the frame 20.

It may be appreciated that other blades or tools may be configured to extend from the aperture 230 in a protruding configuration from the hacksaw assembly 10. For example, in some embodiments where the operable portion 170 of the utility tool 150 is removable from the utility handle 160, the operable portion 170 may alternatively be configured to be received within the aperture 230. In some such embodiments, part of the operable portion 170 generally received in the utility handle 160 may be engaged within the forward portion 70, may be secured by the turnscrew 220, or may be secured to the frame 20 by any other appropriate securing arrangement or mechanism.

Further shown in FIG. 2 is that in an embodiment, the hacksaw assembly 10 may include angled mounting pins 240 (individually a forward angled mounting pin 240a, and a rearward angled mounting pin 240b), configured to couple the hacksaw blade 30 to the frame 20 in an angled configuration. While the angled configuration may vary across embodiments, in the illustrated embodiment the angled configuration is arranged to mount the hacksaw blade 30 to the frame 20 at a 45 degree angle relative to the vertical plane ABCD. Specifically, the forward angled mounting pin 240a is configured to extend from the forward portion 70 (e.g., at a position proximal to forward mounting pin 100a), while the rearward angled mounting pin 240b is configured to extend from the movable mounting arm 130 (at a position proximal to rearward mounting pin 100b). In the illustrated embodiment, the forward angled mounting pin 240a and the forward mounting pin 100a extend in an opposite directions relative to the plane ABCD. Likewise, in the illustrated embodiment, the rearward angled mounting pin 240b and the rearward mounting pin 100b extend in an opposite directions relative to the plane ABCD.

It may be appreciated that to mount the hacksaw blade 30 in the angled configuration, the blade tensioner arrangement 120 may be relaxed, as described below. Where the blade 30 is currently positioned on the forward mounting pin 100a and the rearward mounting pin 100b, the tension across the blade 30 would thus be released, allowing removal of the blade 30 by sliding the forward blade aperture 110a across the forward mounting pin 100a, and sliding the rearward blade aperture 110b across the rearward mounting pin 100b. With the blade tensioner arrangement 120 in the relaxed position, the spacing between the forward angled mounting pin 240a, and the rearward angled mounting pin 240b may also be narrowed so as to readily allow the forward blade aperture 110a to slide onto the forward angled mounting pin 240a, and allow the rearward blade aperture 110b to slide onto the rearward angled mounting pin 240b. By retensioning the blade tensioner arrangement 120, tension may again be applied across the blade 30, securing the blade 30 to the frame 20 at an angle determined by the orientation of the forward angled mounting pin 240a, and a rearward angled mounting pin 240b.

Figure 3:
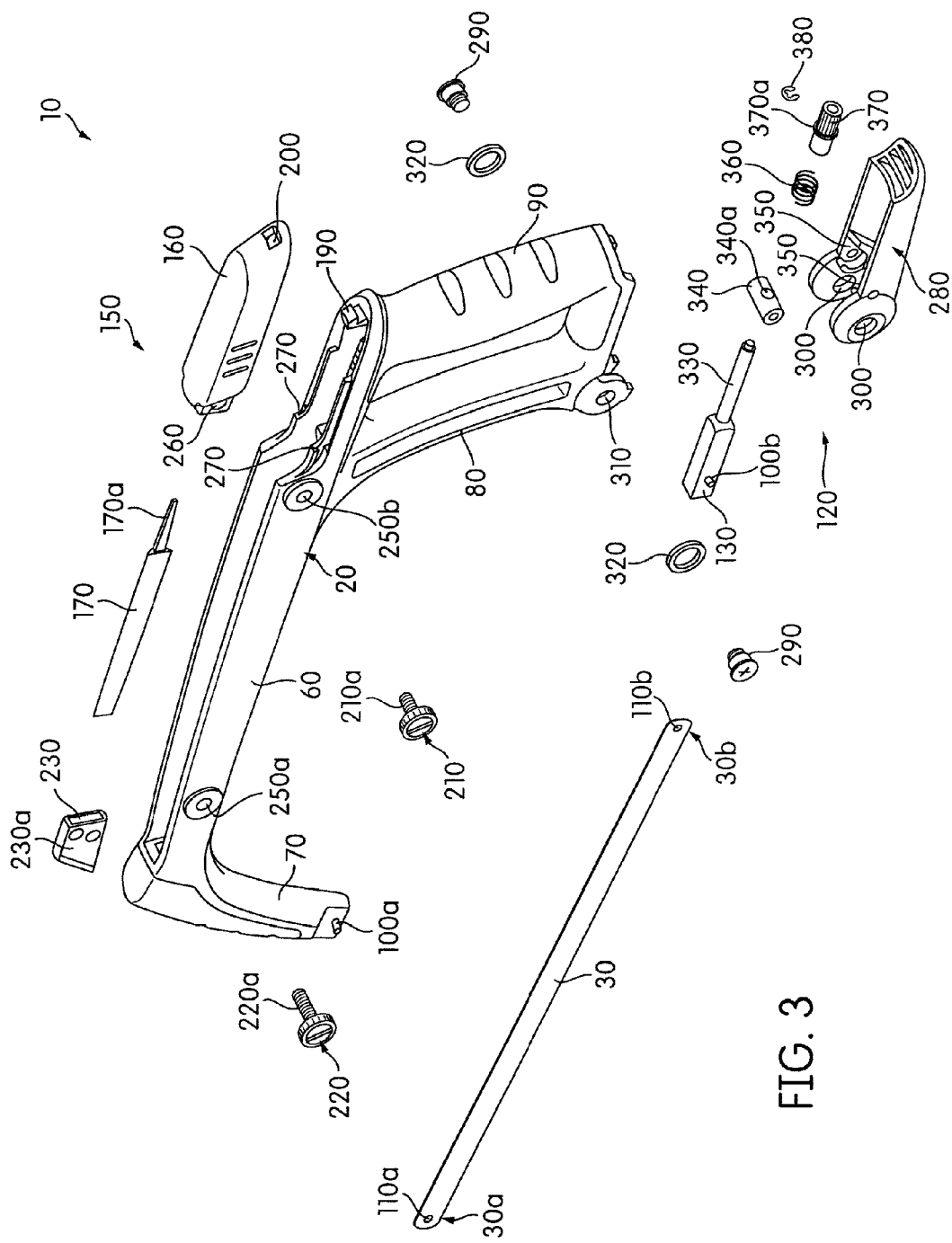
FIG. 3 illustrates an exploded view of the hacksaw of FIG. 1.

FIG. 3 illustrates an exploded perspective view of the hacksaw assembly 10, to illustrate components therein. In particular, the exploded view illustrates that the frame 20 includes receiving apertures 250a and 250b extending from a side of the upper portion 60 into the receiving space 140. It may be appreciated that the receiving aperture 250a may be configured to receive the shaft 220a of the turnscrew 220, while the receiving aperture 250b may be configured to receive a shaft 210a of the turnscrew 210. As shown in the illustrated embodiment, the shaft 210a may extend through the receiving aperture 250b, and engage a securement aperture 260 formed in the utility tool 150. In the illustrated embodiment, the securement aperture 260 is formed in the handle 160, and accordingly may secure the utility tool 150 to the frame 20 when the utility tool 150 is installed therein.

FIG. 3 also shows a pair of engagement grooves 270 formed on the frame 20, configured to engage corresponding members on the utility tool 150 (e.g., on the handle 160) which may further assist in selectively securing the utility tool 150 to the frame 20. In particular, in an embodiment the engagement grooves 270 and the engagement tab 190 may be oriented in the same direction, so as to establish a removal direction for the utility tool 150. Specifically, in the illustrated embodiment it may be appreciated that to remove the utility tool 150 from the frame 20, a user may at least partially remove the turnscrew 210, so as to disengage the shaft 210 from the securement aperture 260. The utility tool 150 may then be slid backwards, away from the intermediate portion 60, back so that the slot 200 disengages from the engagement tab 190, while the handle 160 disengages from the engagement grooves 270. It may be appreciated once the slot 200 and the handle 160 have disengaged, the utility tool 150 may then be pulled away from the frame 20. Both the utility tool 150 and the remainder of the hacksaw assembly 10 may then be utilized as separate tools. For example, a first user may utilize the hacksaw blade 30 by engaging the handle 90, while a second user may utilize the utility tool 150 by engaging the handle 160.

Additionally, illustrated in the exploded view of FIG. 3 are features of the hacksaw assembly 10 that are generally received within other features of the hacksaw assembly 10, or are otherwise obscured in FIGS. 1 and 2. For example, FIG. 3 illustrates a handle contacting portion 170a of the operable portion 170 that may generally extend into the handle 160 of the removable utility tool 150, and may secure the operable portion 170 to the handle 160. As described above, in various embodiments, the operable portion 170 may either be permanently attached to the handle 160, or may be selectively removable therefrom. Accordingly, in some embodiments, the handle contacting portion 170a may alternatively be permanently received in the handle 160, or may be selectively removable from the handle 160. As another example, FIG. 3 also illustrates the aperture defining body 230a. As shown, the aperture defining body 230a may be positioned within the opening 235 of the forward portion 70, and may be configured to define a shape of the aperture 230. In some embodiments, such as where the frame 20 is generally formed of metal, the aperture defining body 230a may be formed of plastic, rubber, or be of another semi-deformable material, or may otherwise have a higher coefficient of friction, configured to tightly secure the blade 30 or another blade extending therethrough. In an embodiment, when the blade 30 or another blade is configured to extend through the aperture 230, it may be secured by the turnscrew 220 (e.g., with the shaft 220a extending through the receiving aperture 250a and one of the blade apertures 110 to secure the blade 30 to the frame 20). While in some embodiments the aperture defining body 230a may be removable, in other embodiments the aperture defining body 230a may be fixed into the opening 235 of the forward portion 70.

Further illustrated in FIG. 3 are the components of the blade tensioner arrangement 120. While the blade tensioner arrangement 120 may vary across embodiments, and may be of any appropriate configuration to selectively apply tension across the blade 30, in the illustrated embodiment the blade tensioner arrangement 120 includes a lever 280 configured to pivot relative to the frame 20 by way of pivot mounts 290 configured to extend through pivot apertures 300 in the lever 280, and pivot apertures 310 formed on the frame 20, so that the lever 280 may pivot relative to the frame 20 between a closed position where the lever 280 is adjacent to the frame 20, and an open position where the lever 280 is pivoted away from the frame 20. As shown, in an embodiment where the pivot mounts 290 are separate bodies in the blade tensioner arrangement 120, washers 320 may also be associated with the pivot mounts 290 to assist in securing the pivot mounts 290 relative to the frame 20 and the lever 280.

In an embodiment, the movable mounting arm 130 includes a shaft 330 extending therefrom. The shaft 330 may slidably extend through an engaging pin 340, which may be received in recesses 350 formed in the lever 280. In particular, the shaft 330 may slidably extend through an aperture 340a formed in the engaging pin 340. In an embodiment, a biasing member 360, such as a spring in the illustrated embodiment, may be configured to engage the engaging pin 340 to apply a force between the shaft 330 and the engaging pin 340, thus applying tension to the hacksaw blade 30 when the lever 280 is in the closed position. For example, in an embodiment, an adjustment member 370 may be coupled to the shaft 330, such that the biasing member 360 is engaged between the adjustment member 370 and the engaging pin 340, applying the force therebetween. As shown, the adjustment member 370 may include an engagement flange 370a configured to support one side of the biasing member 360, while the opposite side of the biasing member 360 engages the engaging pin 340. In the illustrated embodiment, the adjustment member 370 may be selectively adjusted to modify the force applied by the biasing member 360, pushing the adjustment member 370 away from the engaging pin 340, thus adjusting the amount of tension across the hacksaw blade 30. It may be appreciated that the adjustment member 370 may vary across embodiments, and may be of any appropriate configuration to adjust an amount of tension applied across the blade 30. In the illustrated embodiment, for example, the adjustment member 370 may be threaded onto the shaft 330, so as to be selectively positionable thereon, to apply a desired amount of force against the engaging pin 340 by the biasing member 360. As shown, in an embodiment the adjustment member 370 may be prevented from generally being removed from the shaft 330 by a lock clamp 380.

Figure 4:
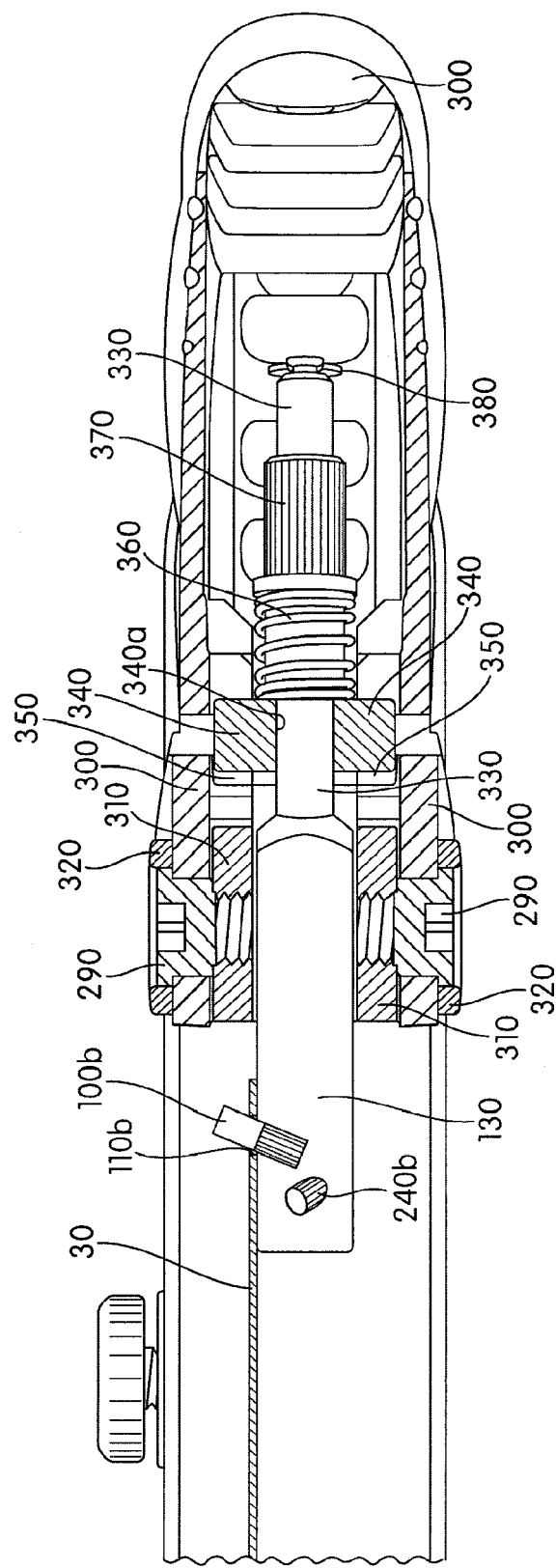
FIG. 4 illustrates a cross sectional view of a blade tensioner arrangement of the hacksaw of the present disclosure.

FIG. 4 illustrates a cross sectional view of the blade tensioner arrangement 120 in the closed position. As shown, the biasing member 360 may engage the engaging pin 340 between where the engaging pin 340 engages the recesses 350, so as to apply the adjusted tension when the lever 280 is in the closed position. By moving the lever 280 to the open position, however, the shaft 330 (and thus the movable mounting arm 130) may slide relative to the engaging pin 340, removing tension from the blade 30, and allowing the blade apertures 110 to slide along the mounting pins 100 (rearward blade aperture 110b and rearward mounting pin 100b being shown in FIG. 4).

As indicated above, other blade tensioner arrangements 120 may be utilized in other embodiments. For example, in an embodiment, the blade tensioner arrangement 120 may be configured similarly to or may otherwise contain features from one or more of U.S. Pat. Nos. 6,925,720, 6,820,340, and U.S. Patent Application Publication No. 2012/0011732, each of which is hereby incorporated by reference in its entirety, or other arrangements knows in the art.

Figure 5:
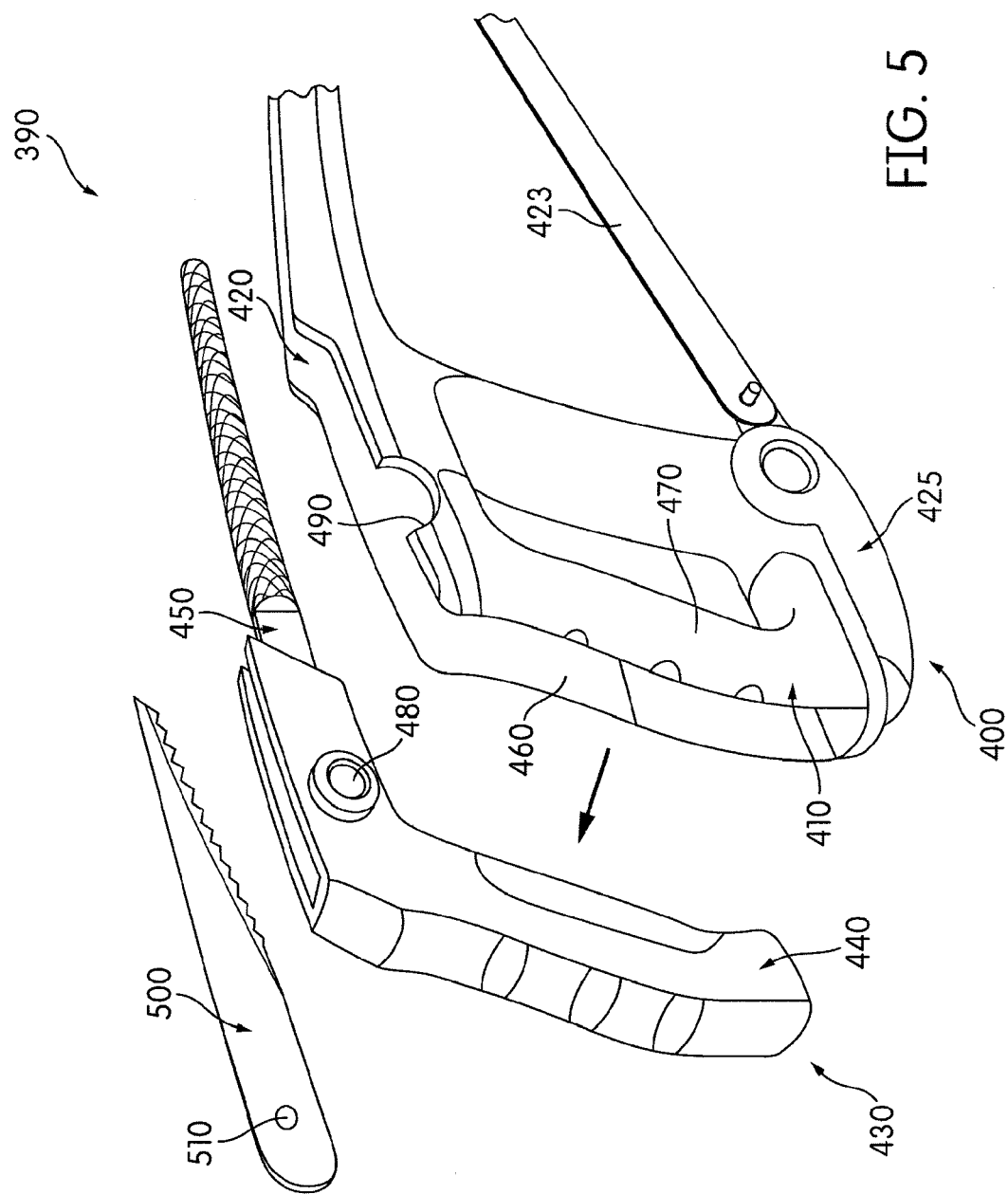
FIG. 5 illustrates a perspective view of another hacksaw of the present disclosure.

Although in the embodiment of FIGS. 1-4, the handle 90 of the hacksaw assembly 10 is separate from the utility handle 160, it may be appreciated that in some embodiments the handle 90 and the utility handle 160 may include common elements. For example, FIG. 5 illustrates an exploded view of a hacksaw assembly 390 having a hacksaw 400 that includes a nestable hacksaw handle 410 and a nestable frame 420. The nestable frame 420 is configured to support a hacksaw blade 423, which may be tensionable through a blade tensioner arrangement 425. In some embodiments, the hacksaw blade 423 and the blade tensioner arrangement 425 may be similar to embodiments of the hacksaw blade 30 and the blade tensioner arrangement 120 of the hacksaw assembly 10 described above.

Configured to be received within the nestable hacksaw handle 410 and the nestable frame 420 is a removable utility tool 430. As shown, the removable utility tool 430 includes a nestable utility handle 440, and an operable portion 450. As shown, the nestable hacksaw handle 410 includes a generally U-shaped receiving portion 460, which may be shaped so that an exterior portion 470 may be engaged by a user's hand, while the U-shaped receiving portion 460 is positioned to the interior, and is configured to receive the nestable utility handle 440 therein. As shown, the nestable frame 420 likewise may have a receiving portion, configured to receive the operable portion 450 of the removable utility too 430 therein, when the nestable utility handle 440 is received in the U-shaped receiving portion 460. While in some embodiments the receiving portion of the nestable frame 420 may be generally U-shaped, in other embodiments the receiving portion may be formed as a bore extending along the nestable frame 420, or may be of any other appropriate configuration.

While in the illustrated embodiment the nestable hacksaw handle 410 and the nestable utility handle 440 are both illustrated to be of a pistol grip configuration, in other embodiments one or more of the nestable hacksaw handle 410 and the nestable utility handle 440 may be oriented to be generally in line with either the operable portion 450 or the hacksaw blade 423. Additionally, the removable utility tool 430 may be secured to the hacksaw 400 by any appropriate mechanism. In the illustrated embodiment, the removable utility tool 430 include an engagement feature 480 configured to be received in a corresponding recess 490 formed in the hacksaw 400. In an embodiment, the engagement feature 480 may snap, click, lock, or otherwise secure the removable utility tool 430 to the hacksaw 400. Such securement may be achieved through any appropriate mechanism, including but not limited to those described in embodiments of the hacksaw assembly 10 above. In another embodiment, the removable utility tool 430 may frictionally engage with the hacksaw 400. In the illustrated embodiment, the engagement feature 400 may be configured to enter into the recesses 490 in a predetermined orientation, so as to limit potential for inadvertent removal of the removable utility tool 430 from the hacksaw 400.

The configuration of the operable portion 450 of the removable utility tool 430 may vary across embodiments. While in some embodiments the operable portion 450 may be permanently fixed to the nestable utility handle 440, in other embodiments the operable portion 450 may be removable from the nestable utility handle 440. In the illustrated embodiment, the operable portion 450, which is configured as a file, couples to the nestable utility handle 440 by the engagement feature 480, which may be configured as a threaded fastener extending through both an engaging end of the operable portion 450 and a receiving portion of the nestable utility handle 440. As shown, in an embodiment an additional operable portion 500, configured in the illustrated embodiment as a jab saw, may be alternatively installed into the nestable utility handle 440, by removal of the engagement feature 480 to disengage the engagement feature 480 from the operable portion 450, removing the operable portion 450 from the nestable utility handle 440, installing the operable portion 500 into the nestable utility handle 440, and securing the engagement feature 480 through an engaging aperture 510 formed in the operable portion 500.

Regardless of the configuration of the hacksaw assembly (e.g., the hacksaw assemblies 10, 390), it may be appreciated that across various embodiments, the removable utility tool thereof (e.g., removable utility tool 150, 440) may be separable therefrom, in a configuration that allows both the utility tool and the hacksaw of the hacksaw assembly to be independently and simultaneously utilized. While hacksaws are depicted herein, other tools utilizing a saw blade and an associated handle may likewise be configured to contain a removable utility tool therein, separable from the saw blade and associated handle, to allow such independent simultaneous use.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A multi-tool saw assembly comprising:
    a saw assembly, including:
        a frame having a first end and a second end;
        a first handle fixed relative to the frame;
        a saw blade, selectively coupled to the frame and extending between the first end and the second end, the saw blade having a first connection portion connected to the first end and a second connection portion connected to the second end; and
    a utility tool, including:
        a second handle and a work portion, the utility tool being separable from the saw assembly;
    wherein the saw blade remains connected to the first end and the second end, and the first handle remains connected to the frame, when the utility tool is separated from the saw assembly,
    wherein the frame includes a forward portion, a rearward portion, and an upper portion connecting the forward portion and the rearward portion,
    wherein, when the utility tool is removably secured to the saw assembly, the work portion of the utility tool extends along the upper portion of the frame, and the second handle is disposed at a portion of the frame where the upper portion and the rearward portion intersect each other in a manner such that the second handle has a surface forming a portion of an outer surface of the frame and/or the first handle and an upper surface of the second handle is aligned with an upper surface of the upper portion and a rear edge of the second handle does not extend rearward beyond a rear edge of the first handle, and
    wherein the upper portion of the frame is constructed and arranged to surround the work portion of the utility tool on at least three sides thereof, when the utility tool is removably secured to the saw assembly.

2. The multi-tool saw assembly of claim 1, further comprising a blade tensioning arrangement configured to apply tension to the saw blade across the first end and the second end.

3. The multi-tool saw assembly of claim 2, wherein the blade tensioning arrangement includes a movable mount for the saw blade; wherein the frame includes a fixed mount for the saw blade; and wherein the saw blade is selectively coupled to both the fixed mount and the movable mount.

4. The multi-tool saw assembly of claim 3, wherein the blade tensioning arrangement is configured to apply tension across the saw blade by moving the movable mount away from the fixed mount when the saw blade is coupled to both the fixed mount and the movable mount.

5. The multi-tool saw assembly of claim 1, wherein the frame is configured to be oriented along a vertical plane that extends through a longitudinal axis of the frame, and is configured to support the saw blade generally parallel to or in the vertical plane so that the blade is a 90 degree orientation relative to a cutting surface.

6. The multi-tool saw assembly of claim 1, wherein the frame is configured to support the saw blade at a 45 degree angle relative to a cutting surface so as to facilitate angled cutting therein.

7. The multi-tool saw assembly of claim 1, wherein the upper portion is extending in a spaced relation from the saw blade between the first end and the second end.

8. The multi-tool saw assembly of claim 7, wherein the upper portion is configured to receive an operable portion of the utility tool therein.

9. The multi-tool saw assembly of claim 1, wherein the first end of the frame comprises an aperture extending therein.

10. The multi-tool saw assembly of claim 9, wherein the aperture is configured to selectively receive the saw blade therein; so that the saw blade may selectively protrude from the first end in a direction away from the second end.

11. The multi-tool saw assembly of claim 1, wherein the utility tool comprises one or more of a file, a jab saw, a knife, a screwdriver, a bit driver, and an awl.

12. The multi-tool saw assembly of claim 1, wherein the utility tool comprises an operable portion extending from the second handle.

13. The multi-tool saw assembly of claim 12, wherein the operable portion is selectively removable from the second handle.

14. The multi-tool saw assembly of claim 13, wherein the operable portion is slidably received in the second handle.

15. The multi-tool saw assembly of claim 1, wherein the utility tool is selectively secured to the frame.

16. The multi-tool saw assembly of claim 15, further comprising a turnscrew configured to selectively extend partially through the frame and the utility tool to selectively secure the utility tool to the frame.

17. The multi-tool saw assembly of claim 16, wherein the turnscrew is further configured to selectively extend partially through the frame and to engage with the second handle.

18. The multi-tool saw assembly of claim 1, wherein the utility tool is separable from the frame by moving the utility tool in a predetermined direction in relation to the frame.

19. The multi-tool saw assembly of claim 1, wherein the saw assembly remains operable as a separate tool after the utility tool is removed therefrom.

\* \* \* \* \*